United States Patent [19]

Reilama et al.

[11] Patent Number: 4,481,074
[45] Date of Patent: Nov. 6, 1984

[54] PROCESS FOR THE PREPARATION OF A SODIUM SULPHITE CONTAINING LIQUOR

[75] Inventors: Ismo Reilama; Arto Vainiotalo; Illmo Yrjälä, all of Rauma, Finland

[73] Assignee: Rauma-Rapola Oy, Rauma, Finland

[21] Appl. No.: 343,867

[22] Filed: Jan. 29, 1982

Related U.S. Application Data

[63] Continuation-in-part of Ser. No. 133,420, Mar. 24, 1980, abandoned.

[30] Foreign Application Priority Data

Mar. 27, 1979 [FI] Finland ..................................... 791015

[51] Int. Cl.³ ....................... C01B 17/62; D21C 11/02
[52] U.S. Cl. ......................................... 162/36; 162/83; 423/512 A; 423/DIG. 3
[58] Field of Search ....................... 162/83, 90, 36, 86, 162/30.1, 30.11; 423/DIG. 3, 438, 512 A

[56] References Cited

U.S. PATENT DOCUMENTS 2,987,432  6/1961  Whitney et al. ..................... 162/36
4,148,684  4/1979  Farin ..................................... 162/36

FOREIGN PATENT DOCUMENTS 59275     7/1981  Finland .
1143844   2/1969  United Kingdom ................ 423/438

Primary Examiner—Steve Alvo
Attorney, Agent, or Firm—Burns, Doane, Swecker & Mathis

[57] ABSTRACT

The method relates to a process in the preparation of the cooking liquor for sodium sulphite pulp for carrying out a reaction between sodium bisulphite and sodium bicarbonate and/or sodium carbonate by bringing solutions containing said compounds into contact with each other. The contact between the solution and gas phase takes place in a layer of tower packings. The carbon dioxide produced as a reaction product is allowed to pressurize the reaction vessel a pressure of 1 to 5 bar by restricting the flow escaping from the reaction vessel and by recovering at the same time the carbon dioxide escaping from the reaction vessel at the said pressure in order to use it for carbonation of a solution of green liquor and/or sodium carbonate.

7 Claims, No Drawings

PROCESS FOR THE PREPARATION OF A SODIUM SULPHITE CONTAINING LIQUOR

This is a continuation-in-part of U.S. Ser. No. 133,420, filed Mar. 24, 1980, now abandoned.

The present invention is concerned with a process, related to the preparation of the cooking liquor of a sodium-based sulphite pulp plant, for the preparation of sodium sulphite solution by mixing together a solution containing sodium bisulphite and a solution containing sodium bicarbonate and/or sodium carbonate and for the recovery under pressure of the concentrated carbon dioxide gas produced as the reaction product, which is to be used for the carbonation of a green liquor solution or of a solution containing sodium carbonate.

The process of the described type is previously known, among other things, from the Finnish patent applications No. 1363/59, 762,711 and Finnish Pat. Nos. 46407 and 61214.

The process in accordance with the invention is the following.

Into the reaction vessel, solutions are fed simultaneously that contain sodium bisulphite, sodium carbonate, and sodium bicarbonate. The following overall reactions take place in the reaction vessel:

$$Na_2CO_3 + 2NaHSO_3 \rightarrow 2Na_2SO_3 + CO_2\uparrow + H_2O \quad (1)$$

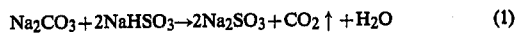

$$NaHCO_3 + NaHSO_3 \rightarrow Na_2SO_3 + CO_2\uparrow + H_2O \quad (2)$$

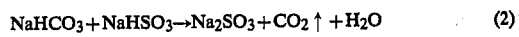

$$NaHCO_3(s) \rightarrow NaHCO_3(l) \quad (3)$$

The reaction according to equation (3) takes place if sodium bicarbonate crystals are present.

The values of equilibrium constants according to available sources indicate that the process in accordance with the invention is possible. The inventive concept is directed to the problem of mass transfer.

In the mass transfer, the following reactions are effective:

$$HCO_3^- \rightarrow CO_2 + OH^- \quad (4)$$

$$H^+ + HCO_3^- \rightarrow CO_2 + H_2O \quad (5)$$

$$HSO_3^- \rightarrow H^+ + SO_3^{--} \quad (6)$$

The reaction according to equation (6) is very rapid, so that it can be assumed that there is equilibrium with respect to this reaction in the reaction vessel.

On the contrary, the reactions according to equations (4) and (5) are slow and constitute limitations regarding mass transfer.

The solution of the problem of mass transfer is, on the basis of available source information, not readily obvious. This is apparent, among other things, in the great scattering of the numerical values contained in different source data. The real solution of the mass transfer problem is based on the control of the specific area between the phases participating in the mass transfer in accordance with the invention. This is also associated with the choice of equipment type suitable for the process.

The process in accordance with the invention is expressly characterized in that the process concerned utilizes the difference in the chemical potentials of the reactions by using part of the difference for pressurizing the carbon dioxide, which constitutes a reaction product. In other words, the process concerned uses part of the energy chemically bound to the solutions fed into the reactor for compressing the gaseous reaction product.

The solution of the mass transfer problem that makes this possible has been contrary to the expectations of general knowledge of persons skilled in the art.

When the solutions enter into the reaction vessel, they are mixed with each other. When the pH-value of the solution containing bisulphite is 2 to 5 and the overall sodium ion concentration is 2.5 to 5 mol per liter and the overall sodium ion concentration of the solution containing sodium bicarbonate and/or carbonate is 3 to 6 mol per liter as well as the temperature about 40° to 110° C., the chemical potential is at the beginning immense. An abundance of very small bubbles are produced. If there are crystals present, the bubbles are produced around the crystals, where the chemical potential is also largest.

In the solution, the following reaction takes place very quickly:

$$CO_3^{--} + HSO_3^- \rightarrow HCO_3^- + SO_3^{--} \quad (8)$$

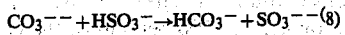

If there are crystals, the bicarbonate is dissolved relatively slowly. Hereupon the reaction in accordance with equation (5) takes place slowly. As bubbles are produced abundantly and they tend to rise in the solution, with more $CO_2$-gas being diffused into them. Bubbles are united with each other and form larger bubbles. From the point of view of the efficiency of the removal of gas it is advantageous that the liquid layer is as thin as possible. When the reaction approaches the condition of equilibrium, bubbles are produced only to a small extent and the area between the phases is reduced considerably. It is known that collisions accelerate the formation of bubbles.

From the reasons given above, a pressure-resistant vessel provided with a layer or layers of tower packings has been chosen to be the sulphiting equipment for the process in accordance with the invention. If sodium bicarbonate crystals are present, a delay time of at least 7 seconds is required for the solution and for the crystals for dissolution of the crystals.

The thickness of the liquid film on the surface of the tower packing is 0.1 to 1 mm, so that the distance and time of rise of the bubbles remain short. The required surface area of tower packing is, for example, 5 to 20 square meters per quantity of kilomole of $Na_2CO_3$ and $NaHCO_3$ fed into the reaction vessel in an hour when the overall sodium ion concentration of the bicarbonate-containing solution to be fed is about 5 mol per liter and bicarbonate concentration 4.5 mol per liter and when the bisulphite concentration of the solution containing sodium bisulphite is 3.8 mol per liter while the sodium ion concentration is 4.0 mol $Na^+$ per liter, pH=4.0, and reaction temperature 80° C.

The liquid hold-up of the reaction equipment and, at the same time, the delay time of the reacting solutions in the reactor may be increased by providing the downstream end of the reactor with one or several bottoms filled with liquid, which bottoms are connected with a joint gas space of the reactor. The quantity of sodium bisulphite to be fed into the reactor can be adjusted as a function of the pH-value of the bottom product.

The most important advantage of the process is achieved from the pressurized recovery of the carbon dioxide gas. Earlier corresponding processes require mechanical pressurization of carbon dioxide before the gas is used again in the carbonation process. By means of this new process it is possible to avoid the compressing of the gas by means of mechanical equipment, which is expensive both as an investment and as to its operating costs. The present process uses part of the high difference in chemical potentials prevailing in the reaction process for pressurizing the product. As another advantage of the process it is possible to consider the elimination of intermediate storage of the gas, which is necessary in the previous processes. Storage of gas has involved an unreasonably large sum of investment costs in plants for the recovery of cooking chemicals at sodium sulphite pulp plants. In this process the intermediate storage of carbon dioxide takes place as storage of a solution containing sodium bicarbonate and/or sodium carbonate while carbon dioxide is chemically bound in these solutions.

When the sulphiting reactor is run with the correct loading in relation to the needs of the points of consumption of carbon dioxide, intermediate storage of gaseous carbon dioxide is totally avoided. This is possible when the consumption of carbon dioxide in the point of consumption is 30 to 100 percent of the carbon dioxide produced by the sulphiting reactor, which maintains the carbon dioxide equilibrium of the recovery of cooking chemicals when flue gas containing carbon dioxide is used in a known way for precarbonization of green liquor.

The best way to find the merits of this method is to have a short look at the process parameters in an example case as follows:

EXAMPLE

The liquor stream containing sodium carbonate and bicarbonate fed into the reactor is 27.6 cubic meters per an hour. Sodium bicarbonate concentration of this liquor is 0.80 moles per liter and sodium carbonate concentration 2.08 moles per liter.

The sodium bisulphite feed is 53.7 cubic meters per an hour and it has sodium bisulphite concentration of 3.66 moles per liter while sodium sulphite concentration of this same liquor is 0.67 moles per liter.

When these two liquors react with each other in the way described above in the reactor under pressure of 3.75 bar over athmopheric pressure and in the temperature of 80° C. the liquor coming out of the reactor has the composition as follows: Sodium bicarbonate concentration is 0.24 moles per liter, sodium sulphite concentration 1.90 moles per liter and sodium bisulphite concentration is 0.96 moles per liter. This means that the yield of the pressurized carbon dioxide is about 75 percent of the stoichiometric value.

In many cases operations such as in the example with a corresponding yield of pressurized carbon dioxide is quite satisfactory but also higher yield values are required. These requirements become achievable with the following arrangements. The liquor stream coming out of the reactor is permitted to expand from the pressure level of the reactor to a lower level. Depending on the pressure to which the expansion is permitted to take place all or a part of the carbon dioxide chemically combined or dissolved in the liquor is liberated into the gas phase. By separating the thus formed gas from the liquor and by absorbing this low pressure carbon dioxide back into the liquor feed, which contains sodium carbonate, the yield of pressurized carbon dioxide from the process can easily be increased up to 90 percent and even higher.

The absorption of carbon dioxide is based on the chemical reaction between sodium carbonate and carbon dioxide producing sodium bicarbonate. This absorption step is easy to perform by utilizing existing absorption technology and equipment.

If this method to increase the yield of pressurized carbon dioxide is utilized in the example the process parameters are as follows:

EXAMPLE

The liquor taken out of the reactor is permitted to expand to atmospheric pressure. The amount of low pressure carbon dioxide liberated is 11 kilomoles per an hour. This carbon dioxide is absorbed at atmospheric pressure into the liquor stream which contains sodium carbonate. Sodium bicarbonate concentration of this liquor increases from the level of 0.80 moles per liter to the level of 1.60 moles per liter. This means that the amount of pressurized carbon dioxide increases from the rate of 59.9 kilomoles per an hour to 70.9 kilomoles per an hour.

We claim:

1. In a process for the preparation of a sodium sulphite-containing solution wherein a reaction between sodium bisulphite and a carbonate compound selected from the group consisting of sodium bicarbonate, sodium carbonate and mixtures thereof is carried out by contacting solutions containing said compounds with each other, and wherein carbon dioxide is liberated as a reaction product, said reaction being further characterized in that the contact between the solutions and gas phase takes place in a reaction vessel comprising at least one layer of tower packings wherein the tower packings have a surface area of from 5 to 20 square meters per kilomole of sodium carbonate and sodium bicarbonate fed to the reaction vessel in an hour, the reaction temperature ranges from 40° to 110° C., the reaction vessel is pressurized via the formed carbon dioxide so that the pressure therein exceeds atmospheric pressure by from 1 to 5 bars, essentially all of the carbon dioxide liberated as a reaction product is recovered under super atmospheric pressure and is used for the pressurized carbonation of green liquor or sodium carbonate without any additional compressing of the gas, the pH of the solution recovered from the bottom portion of the reaction vessel is from 6 to 8, the total sodium ion concentration in the feed solutions containing said carbonate compound is from 3 to 6 moles/liter, the total sodium ion concentration in the feed solution containing sodium bisulphite is from 2.5 to 5 moles/liter with the pH thereof being from 2 to 5.

2. The process of claim 1, further characterized in that a solution comprised of a carbonate compound is fed to the reaction vessel so that the carbon dioxide produced as a reaction product can be used upon recovery without significant intermediate storage of the gas.

3. The process of claim 1 further characterized in that the feed solution containing sodium bicarbonate comprises sodium bicarbonate crystals.

4. The process of claim 1 further characterized in that the retention time of the liquid solution in the tower packings is at least 7 seconds.

5. The process of claim 1 further characterized in that the quantity of sodium bisulphite fed into the packed reaction tower is controlled as a function of the pH of the solution recovered from the bottom portion of the reaction vessel.

6. The process of claim 1 further characterized in that at the bottom of the reaction vessel there exists a liquid layer of at least one meter in depth.

7. The process of claim 1 further characterized in that the pH of the sodium bisulphite containing feed solution is from 3.5 to 4.5.

* * * * *